United States Patent [19]
Gesslein

[11] 3,799,606
[45] Mar. 26, 1974

[54] BABY CARRIAGE

[76] Inventor: Georg Gesslein, 8621) Mannsgereuth, Krs. Lichtenfels, Germany

[22] Filed: Oct. 13, 1971

[21] Appl. No.: 188,846

[30] Foreign Application Priority Data
Oct. 14, 1970  Germany..................... 7037990[U]
July 14, 1971  Germany......................... 2135185

[52] U.S. Cl. ............... 296/28 B, 5/93 R, 296/78 A
[51] Int. Cl. .............................................. B62b 9/12
[58] Field of Search ...... 296/1 B, 28 B, 78 A, 78 R, 296/110; 280/47.38; 5/93 R, 94, 97; 135/5 A

[56] References Cited
UNITED STATES PATENTS
| | | | |
|---|---|---|---|
| 3,575,461 | 4/1971 | Goldman et al. | 296/28 B |
| 3,323,147 | 6/1967 | Van Dean | 5/93 R X |
| 1,319,479 | 10/1919 | Lloyd | 296/110 |
| 2,401,605 | 6/1946 | Boren | 5/97 |
| 2,971,796 | 2/1961 | Morvai et al. | 296/28 B |
| 2,645,502 | 7/1953 | Collins et al. | 280/47.38 X |

FOREIGN PATENTS OR APPLICATIONS
| | | | |
|---|---|---|---|
| 1,909,653 | 9/1970 | Germany | 296/28 B |
| 75,707 | 3/1953 | Denmark | 296/78 A |

Primary Examiner—David Schonberg
Assistant Examiner—Leslie J. Paperner
Attorney, Agent, or Firm—W. G. Fasse

[57] ABSTRACT

A baby carriage body is provided with see-through means and means for selectively covering said see-through means. Such covering may be accomplished, for example, by a tiltable hood of opague material. The wall of the carriage body may be hollow and inflatable.

2 Claims, 9 Drawing Figures

PATENTED MAR 26 1974  3,799,606

BABY CARRIAGE

BACKGROUND OF THE INVENTION

The invention relates to baby carriages in general and more particularly to perambulators having a frame to which there is, or can be, attached a body comprising both see-through and opaque walls and a bottom, especially in the form of a through, box, carrying bag or the like, with an optionally detachable hood. The term "perambulator" or, for short, "pram" as used herein includes baby carriages of all sorts, i.e. not only those having a box-shaped body, tub, trough, box, carrying bag or the like, but also strollers, baby strollers, toy prams, convertibles, etc.

Heretofore, baby carriages of this type have been proposed comprising a body either with windows at the side or in the part facing the direction of movement, the windows being made of transparent weather-resistant material, e.g. of transparent plastics.

Prams having see-through portions in their walls enable the infant to lie in a face-down position which has considerably medical advantages over the face-up position. However, conventional baby carriages with see-through parts are inconvenient in several respects. For example, even though the pram body be substantially transparent at least at its front end, there is usually a frame or other opaque portion impeding free view of the infant when he raises his head, as babies do with pleasure already in their first months of life. This obstruction to view also exists where the whole body and/or the hood are made of transparent material. Moreover, it was experienced that mothers and nurses alike are opposed to completely transparent prams because any disorder, however temporary, will be conspicuously apparent if the whole interior of the body including bed or mattress, pillows, covers, food containers, diapers, babycare means and the like can be seen from all sides.

Therefore, the inventor developed a baby carriage body disclosed in my copending patent application Ser. No. 52,298 filed July 6, 1970 and now U.S. Pat. No. 3,712,636, said body being elevated at one of its ends and comprising, both in the side walls and in the end wall, windows which extend over substantially the whole height of the end wall and, at least near said end wall, above the edge of the non-elevated parts of the body. Such a pram will satisfy all practical requirements, including those related to the face-down position of the infant. Aside from its general utility, however, it is to be noted that manufacturing a baby carriage of this type is somewhat cumbersome and expensive. In addition, attaching light screens may bring about problems.

OBJECTS OF THE INVENTION

It is thus an important object of the invention to eliminate the drawbacks of the prior art and to provide a perambulator requiring a minimum of effort regarding both construction and manufacture and permitting of optimum versatility.

It is a further object of the invention to provide an improved baby carriage of a simple, yet sturdy design suitable especially for rearing babies in a face-down position.

SUMMARY OF THE INVENTION

The invention provides in a perambulator having a frame and a body with see-through and opaque walls and a bottom, and further having an optionally detachable hood, the improvement comprising an elevated body end with front and side wall windows which extend over substantially the whole height of said body end and, at least adjacent said front wall, extend both above and below the edge of the non-elevated parts of the body, which comprises a trough made from transparent plastics whose upper edge is reinforced and further comprises a window screening as well as means for attaching said screening to the perambulator.

When made to include, at least adjacent said end wall, the upper edge thereof, the windows may extend without opaque portions up to the upper edge of the body so that the latter can, if desired, be manufactured in one piece. At least at the upper edge, which is reinforced by crimping, folding, flanging, bracing or the like, such windows need not be bonded or otherwise secured to the body material; it is therefore possible to dispense with joints that would be exposed to considerable stresses. Rather than integrally, the body may also be made of several pieces or parts and may include a detachable see-through portion which may comprise one of the body ends.

The design according to the invention greatly lowers manufacturing cost, since permanent connections between different structural materials are avoided or reduced to a minimum. By this arrangement the lifetime of the pram is also considerably increased. The detachable screens can be mounted later if and when needed, and attached to the body or to the hood at various places, either inside or outside or at an edge.

In a preferred embodiment of the invention, the screen overlaps at least part of the body at its upper edge. Even a temporary attachment will thus be more lasting. Attachment of the screen by means of clip fasteners is advantageous for both manufacture and use, and zip fasteners, adhesive bands or any other kind of detachable fastening means are also suitable. It is possible to provide several contiguous screens which can induvidually be mounted and detached.

According to another feature of the invention, the body may consist of a trough made in a single piece from a transparent foil, for example, by a deep-drawing process. A reduction in production cost can also be achieved by injection moulding or blowing a trough of plastics material. In all these cases it is not difficult to provide the upper edge with a crimped edge similar to baby bath tubs.

Another important and independent feature of the invention consists in that in a pram whose body and/or hood having opaque portions, the body is lower, or can be lowered, at least in the opaque portions of its end part provided with a window, than are the remaining parts of the body. The windows may be part of a body portion that can be mounted on the lower body end or be detached therefrom. Such a body portion may be the hood if suitably shaped, and it may be attached and/or fixed to either body end. This design, too, leads to considerable economies in manufacture due to the fact that less material and fewer connections will be required.

The invention further provides means to lower or to detach either the transparent and/or the opaque parts of the body end, e.g. by means of a folding or tilting mechanism or a pneumatic piston device, preferably disposed inside a double wall.

Moreover, the body may have inflatable walls, in particular with welded foils of plastics material and provided with a valve. Instead thereof, or in addition, the walls of the body may be made from foamed plastics or contain layers of foamed plastics.

By another advantageous embodiment of the invention opaque surfaces of the lowerable or collapsible hood serve as window screens. This design does away with additional parts which are apt to be inconvenient to store or to get lost.

SHORT FIGURE DESCRIPTION

Other objects, features, details and advantages of the invention will become apparent from the following description of preferred embodiments illustrated in the drawings, wherein various commonly used pram parts are not shown since they are not subject of the present invention.

PREFERRED EMBODIMENTS

Figure 1:
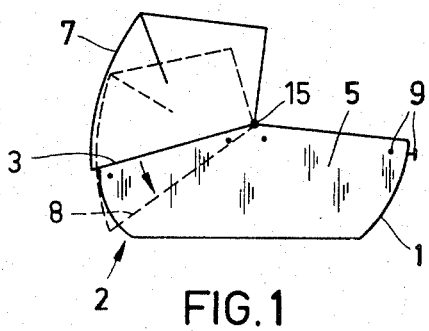
FIGS. 1 to 7 are simplified side elevations of seven embodiments of the invention.

In the pram shown in FIG. 1 the body 1 which can be connected to the frame (not represented) for example by rails, has at one of its ends 2 a downwardly sloping upper edge 3. The body 1 is preferably a trough made in one piece, e.g. by deep-drawing from a clear or transparent foil of plastics material. The windows 5 extend directly, i.e. without interruption, up to the upper edge 3 and include the latter without intervening opaque portions. The hood 7 attached to the body 1 can be tilted downwards about pivots 15 and is held in its upper position by locking means (not shown). The folded-down position is shown in dotted lines in FIG. 1 from which it is seen that the lower parts of the hood 7, whose walls are preferably opaque, serve as screens or sunshade for at least a part of the non-elevated end 2 of the body. If desired, further screens (not shown) may be inserted into the body 1 and/or attached thereto by means of clip fasteners 9 or by any other fixing means such as zip fasteners, adhesive bands or the like.

Figure 2:
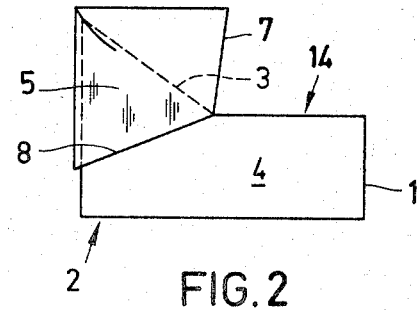

In the embodiment according to FIG. 2 the body 1 has at its end 2 an elevated cockpit with windows 5 which are transparent up the upper edge 3. If desired, this cockpit may form a detachable unit. The remaining lateral parts 4 of the body 1 are opaque. When the hood 7 is attached to the body, it acts as a screen for the windows 5 of the cockpit. It is seen that the opaque wall parts 4 are lower at the end 2 bearing the windows 5 than at the remaining portions 14.

Figure 3:
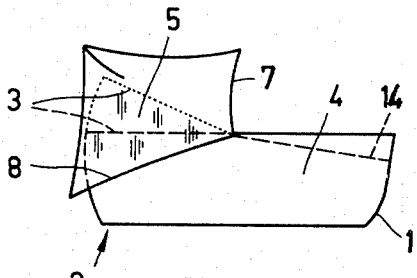

A similar design is shown in FIG. 3. A cockpit whose windows 5 also extend up to the rising upper edge 3 is shown in dotted lines. As indicated by these dotted lines, the cockpit may be designed as a rigid transparent enclosure whose top is horizontal and has no frame parts while the upper edges of teh remaining parts 14 of the body slope downwards. When the hood 7 is mounted on to the body 1, its walls (preferably opaque in this embodiment) cover the windows 5 completely.

Figure 4:
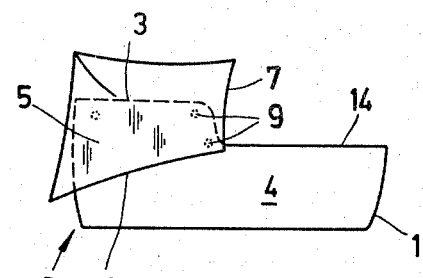

The pram according to FIG. 4 has windows 5 in the elevated part 2 of the body 1 and the upper edge 3 of the windows is displaced upwardly from, and substantially parallel with, the upper edge of the remaining opaque part 14 of the body. The screens for the windows may again be formed by the hood 7, but in addition, clip fasteners 26 are provided for attaching, e.g. on the inner side, a detachable lining, flap or the like.

Figure 5:
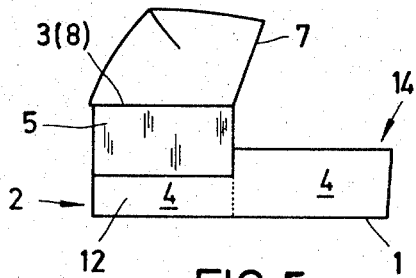

The body 1 of the pram shown in FIG. 5 includes a section 12 with opaque walls and made integrally in its upper part with windows 5. The section 12 can be lowered and raised, e.g. by sliding along guides (not shown), and notches may be provided for locking engagement at the desired level. The guides of the section 12 may, for example, be of the telescopic rod-and-tube type, with or without springs. The remaining parts of the pram may be designed similar to the other embodiments, and the hood 7 may, contrary to FIG. 5, be similar to that shown in FIGS. 1 to 4, so that it forms a screen for the windows 4 of the cockpit of the body.

Figure 6:
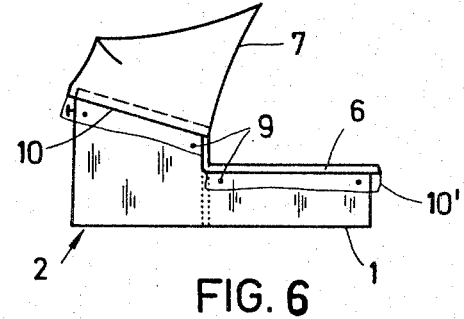

The body shown in FIG. 6 is made in one piece from a transparent, preferably completely clear plastics material. Its upper edge has a rounded bead 6 engaged by screens 10 or 10' to be buttoned on. The screens may be cut in such a manner that they are not only contiguous but overlap in the middle of the body, as indicated by dotted lines.

Figure 7:
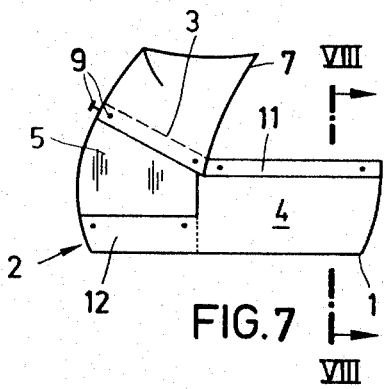

The pram of FIG. 7 is similar in its function to that of FIG. 5. However, the body 1 has at its upper edge a frame 11 which may be of wood, plastics or the like, and is secured to the walls of the body 1. As seen from FIG.8, the body may have double-walls 13 which may serve to receive a mechanism for guiding the vertically movable section 12 at the elevated end 2 and to cover this mechanism both inside and outside. Such a mechanism may be designed in a conventional manner, e.g. using articulated levers, guide rods, lazy tongs or the like. The movable section 12 is again topped by a cockpit with windows 5 which can be wholly or partly covered with screens fixed by slip fasteners 9. The hood 7 itself may be designed to largely serve as a screen, for example, allowing to be tilted downwards much as in the pram according to FIG. 1.

Figures 8, 9:
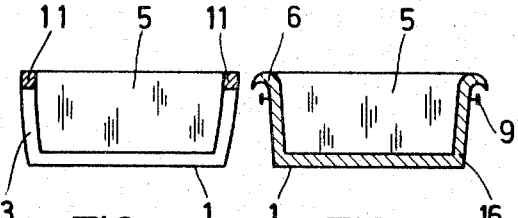
FIG. 8 is a section along line VIII—VIII of FIG. 7.
FIG. 9 is a corresponding section through a pram according to FIG. 6.

The pram body 1 shown in FIG. 9 is a double-walled trough with crimped or rounded edges 6 and a foam-plastics filling 16 between the double wall. This filling serves both for supporting the two walls and for stiffening the whole trough. The filling 16 can be produced by foaming synthetic resins in situ within the walls. It also provides a good thermal insulation without appreciably increasing the weight of the body 1.

By another embodiment of the invention (not shown), the body has inflatable double walls provided with a valve. In this case the compressed air contained in the walls both upholsters and thermally insulates the walls. Inflatable walls of this kind may, of course, be made from pliable foils and both opaque portions and partially or completely transparent windows may be constituted in this manner.

In all the embodiments of the invention the windows may be either colourless or tinted expecially with colour shades providing protection against sunlight, and the screens may be opaque or equally dyed as required, for example using customary sunlight protection colouring. Any suitable material may be used for the windows such as transparent sheet material of acrylic resin, celluloid, glass, compound glass, hard or pliable plastics and the like.

Although specific examples have been described, it is to be understood that the invention is intended to cover all equivalents and modifications within the scope of the appended claims since the arrangements and types of structural components utilized within this invention may be subjected to numerous variations familiar in the art.

I claim:

1. In a baby carriage of the type having a body adapted to be supported on a wheeled carrier having a handle, wherein said body has a bottom, and head, side and foot walls defining a cradle for accommodating a baby in belly-down position with his head adjacent said head wall; the improvement wherein said body is comprised of a unitary opaque trough, and a transparent cockpit adjoining the upper edges of the lateral walls of said trough at one end thereof and forming a detachable, unitary window member at said one end, the upper edges of the walls of said trough at said one end thereof adjoining said cockpit being lower than the upper edges of said walls at the other end of said trough, the upper edges of the walls of said cockpit being higher than the upper edges of said walls at said other end of said trough, whereby said cockpit is elevated with respect to said other end of said trough, and an opaque hood attached to said lateral walls of said body and movably mounted thereon to selectively shield said cockpit.

2. The baby carriage of claim 1, wherein the lateral walls of said cockpit are generally triangular shaped with one end thereof adjoined to said upper edge of the lateral walls of said trough and extending from the head of said body generally to the center of said lateral walls of said trough, a second edge thereof defines the upper head end of said body, and the third edges thereof define the upper edge of said cockpit, and said hood is pivoted to the center of the lateral walls of said trough.

* * * * *